(No Model.)

F. A. SAVAGE & M. G. WADE.
BELT APPLYING DEVICE.

No. 588,838. Patented Aug. 24, 1897.

WITNESSES:
William P. Goebel
Isaac B. Owen

INVENTORS:
F. A. Savage.
M. G. Wade.
BY
ATTORNEYS.

UNITED STATES PATENT OFFICE.

FORDYCE A. SAVAGE AND MILAN G. WADE, OF DOWAGIAC, MICHIGAN.

BELT-APPLYING DEVICE.

SPECIFICATION forming part of Letters Patent No. 588,838, dated August 24, 1897.

Application filed April 8, 1897. Serial No. 631,218. (No model.)

*To all whom it may concern:*

Be it known that we, FORDYCE A. SAVAGE and MILAN G. WADE, of Dowagiac, in the county of Cass and State of Michigan, have invented a new and Improved Belt-Applying Device, of which the following is a full, clear, and exact description.

This invention is an apparatus for facilitating the application of belts to the peripheries of pulleys and drums; and the invention is characterized generally by a clamping device which engages the periphery of the pulley or drum and projects beyond the side thereof, so as to lift the belt and turn the same upon the periphery of the pulley or drum, after which the device drops from the belt or pulley as the same turns the belt-applying device from beneath the belt.

This specification is the disclosure of one form of our invention, while the claims define the actual scope of the conception.

Reference is to be had to the accompanying drawings, forming a part of this specification, in which similar characters of reference indicate corresponding parts in all the figures.

Figure 1:
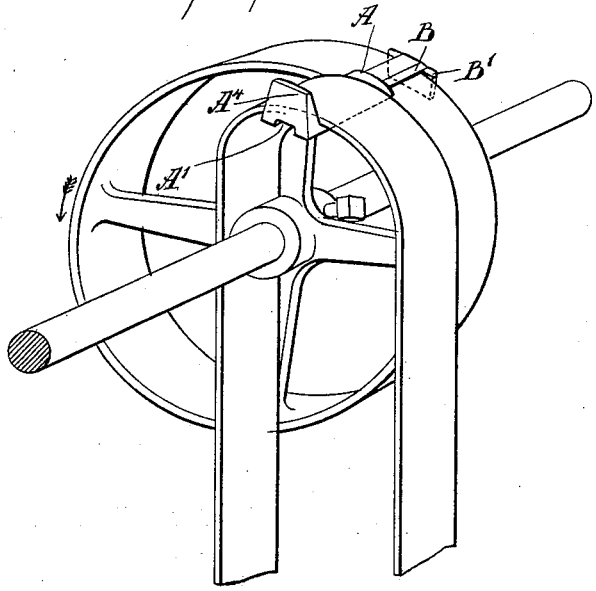
Figure 2:
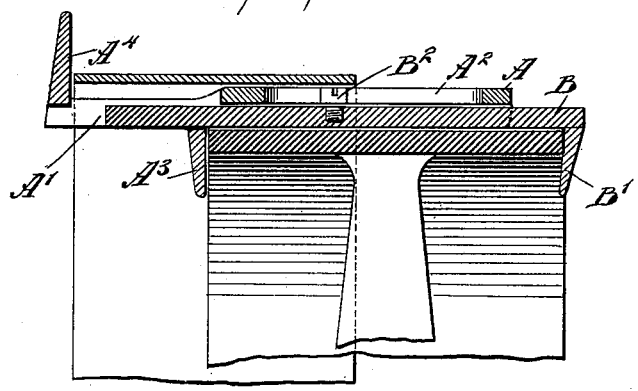
Figure 3:
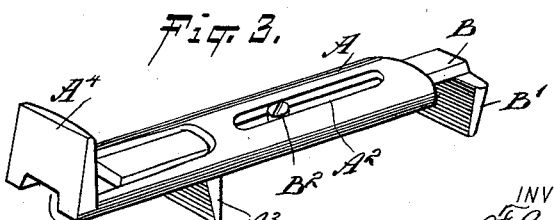

Figure 1 is a perspective view of the invention in use. Fig. 2 is a sectional view taken longitudinally with the axis of the pulley, and Fig. 3 is a perspective view of the belt-applying device detached.

The belt-applying device is formed in two sections A and B. The section B engages the periphery of the pulley and has at one end an inwardly-bent lug $B'$. The lug $B'$ is adapted to engage one edge of the periphery of the pulley, as shown in Figs. 1 and 2, and by reason of the inclined disposition of the lug $B'$ the lug locks with the under edge of the rim. The section A has a groove $A'$ formed in its under face, in which groove the section B is slidable. The section A has a slot $A^2$, through which a screw $B^2$, carried on the section B, slides. By these means the two sections are held in adjustable connection with each other. The section A carries a lug $A^3$, projecting downward therefrom in the same direction that the lug $B'$ projects. The section B slides freely over the upper edge of the lug $A^3$, which is attached to the section A and engages each side of the groove $A'$ in the section A. By adjusting the two sections A and B so as to move the lugs $B'$ and $A^3$ toward or from each other the device will be adapted to the rim of the pulley, the lugs respectively engaging the side edges of the rim. The end of the section A that projects beyond the section B is provided with a perpendicular lug $A^4$, extending oppositely to the lugs $B'$ and $A^3$ and designed to retain the belt on the section A.

In using the invention the sections are adjusted so that the lugs $B'$ and $A^3$ will engage the pulley. The belt is now lifted on the section A and will be retained by means of the lug $A^4$. The pressure of the belt on the end of the section A, which end carries the lug $A^4$, tends to lift the inclined lug $B'$ against the pulley, which operation, together with the draft of the belt tending to draw the device diagonally across the face of the pulley, clamps the belt-applying device on the pulley so long as the belt engages the device. The shaft is now started to revolve in the direction of the arrow in Fig. 1, whereupon the belt will be carried over the pulley, and as the revolution of the shaft continues the pulley will turn the belt-applying device out of engagement with the belt, whereupon, the pressure on the lug $B'$ being relieved, the belt-applying device will drop from the pulley.

The purpose of the sliding of the sections A and B is to adapt the device to all sizes of pulleys. The lugs should loosely engage the pulley when the belt is not run over the belt-applying device, but when the belt is in the belt-applying device the pressure of the belt binds the lug $B'$ against the pulley and holds the device in place.

Having thus described our invention, we claim as new and desire to secure by Letters Patent—

1. A belt-applying device, consisting in one section having a groove and having two lugs projecting in opposite directions, and a second section sliding in the groove and having a lug projecting in the direction of one of the lugs on the first-named section, two of the lugs serving to hold the device on the pulley and the third of the lugs serving to engage the belt and hold the same on the section which carries said third lug.

2. A belt-applying device, consisting in a member having two lugs run transversely to the member, the member being capable of lying transversely on the rim of a pulley and of having the lugs respectively engaged with the edges of the rim, a portion of the said member projecting beyond the rim to carry the belt whereby the weight of the belt will force one of the lugs against the rim of the pulley to hold the belt-applying device in position.

3. A belt-applying device, consisting in two slidably-connected sections each section having a lug thereon, the lugs being projected in like directions and the belt-applying device being capable of lying flat against the periphery of a pulley so as to engage the lugs respectively with the edges of the said periphery, and a portion of the belt-applying device being capable of projecting transversely beyond the periphery of the pulley so that the belt bearing on said projected portion will rock the belt-applying device on one edge of the periphery to bind one of the lugs against the periphery and prevent the displacement of the belt-applying device until said device is disengaged from the belt.

4. A belt-applying device, consisting in a flat structure having two lugs thereon, the lugs being projected in like directions and the said flat structure being capable of lying flat against the periphery of a pulley with a portion of the structure projected beyond the same whereby the belt bearing on said projected portion will tend to rock the said structure on one edge of the periphery and bind one of the lugs against the opposite edge of the periphery whereby to hold the belt-applying device in position until said device is disengaged from the belt.

5. A belt-applying device, consisting in a section having two lugs projected in opposite directions, and a second section slidably connected with the first section and having a lug projected in the direction of one of the lugs on the first-named section, two of the lugs serving to hold the device on the pulley and the third of the lugs serving to engage the belt and hold the same on the section which carries said third lug.

FORDYCE A. SAVAGE.
MILAN G. WADE.

Witnesses:
Mrs. THOS. HUFF,
LINNIE WADE.